US009047596B2

(12) United States Patent
Williams et al.

(10) Patent No.: US 9,047,596 B2
(45) Date of Patent: *Jun. 2, 2015

(54) INTEGRATED POINT OF SALE TERMINAL

(71) Applicant: Gilbarco Inc., Greensboro, NC (US)

(72) Inventors: Rodger K. Williams, Siler City, NC (US); Kenneth Ringeman, Kernersville, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,567

(22) Filed: Feb. 19, 2013

(65) Prior Publication Data

US 2013/0275244 A1    Oct. 17, 2013

Related U.S. Application Data

(63) Continuation of application No. 12/751,122, filed on Mar. 31, 2010, now Pat. No. 8,386,322.

(60) Provisional application No. 61/165,125, filed on Mar. 31, 2009.

(51) Int. Cl.
*G06G 1/12* (2006.01)
*G06Q 20/00* (2012.01)
*G06Q 20/20* (2012.01)
*G06Q 20/18* (2012.01)
*G07F 13/02* (2006.01)

(52) U.S. Cl.
CPC .............. *G06Q 20/202* (2013.01); *G06Q 20/18* (2013.01); *G06Q 20/20* (2013.01); *G07F 13/025* (2013.01)

(58) Field of Classification Search
CPC .................... G06Q 20/202; G06Q 20/20
USPC .......................................................... 705/21
See application file for complete search history.

(56) References Cited

U.S. PATENT DOCUMENTS

| | | |
|---|---|---|
| 4,967,366 A | 10/1990 | Kaehler |
| 5,453,601 A | 9/1995 | Rosen |
| 5,602,745 A | 2/1997 | Atchley et al. |
| 5,889,676 A * | 3/1999 | Kubo et al. .................. 700/231 |
| 6,047,067 A | 4/2000 | Rosen |
| 6,115,690 A | 9/2000 | Wong |
| 6,116,505 A | 9/2000 | Withrow |
| 6,364,206 B1 | 4/2002 | Keohane |
| 6,373,950 B1 | 4/2002 | Rowney |
| 6,527,176 B2 | 3/2003 | Baric |
| 6,606,744 B1 | 8/2003 | Mikurak |
| 6,685,088 B1 | 2/2004 | Royer et al. |
| 6,685,089 B2 | 2/2004 | Terranova et al. |

(Continued)

OTHER PUBLICATIONS

Bolita, Dan, "Retailers Seek Single Payment Processing Solution," TODAY, The J. of Work Process Improvement, vol. 29, No. 1, Boston, Jan./Feb. 2006, pp. 12-16.

*Primary Examiner* — Seye Iwarere

(74) *Attorney, Agent, or Firm* — Nelson Mullins Riley & Scarborough, LLP

(57) ABSTRACT

An integrated point-of-sale terminal for use with a fuel dispenser has a site controller, at least one dispenser having a user interface, at least one processor at the site controller, memory coupled to the processor, and a plurality of point-of-sale applications associated with the site controller. The processor is configured to dynamically regulate which of the plurality of point-of-sale applications has control of the dispenser user interface based on a set of business rules.

19 Claims, 5 Drawing Sheets

(56) References Cited

U.S. PATENT DOCUMENTS

| | | | |
|---|---|---|---|
| 6,721,713 B1 | 4/2004 | Guheen et al. | |
| 6,778,967 B1 | 8/2004 | Nicholson | |
| 6,810,304 B1 | 10/2004 | Dickson | |
| 7,039,593 B2 | 5/2006 | Sager | |
| 7,086,584 B2 | 8/2006 | Stoutenburg et al. | |
| 7,107,249 B2 | 9/2006 | Dively et al. | |
| 7,299,976 B2 | 11/2007 | Nakada et al. | |
| 7,793,838 B2 | 9/2010 | Appleyard et al. | |
| 2001/0018627 A1* | 8/2001 | Leatherman et al. | 700/234 |
| 2002/0032582 A1 | 3/2002 | Feeney, Jr. et al. | |
| 2002/0059139 A1 | 5/2002 | Evans | |
| 2002/0147648 A1* | 10/2002 | Fadden et al. | 705/16 |
| 2003/0025600 A1* | 2/2003 | Blanchard | 340/539 |
| 2003/0028285 A1* | 2/2003 | Zura et al. | 700/241 |
| 2003/0229541 A1 | 12/2003 | Randall et al. | |
| 2004/0064351 A1 | 4/2004 | Mikurak | |
| 2004/0204999 A1* | 10/2004 | Negley et al. | 705/16 |
| 2006/0085335 A1 | 4/2006 | Crawford et al. | |
| 2007/0011044 A1 | 1/2007 | Hansen | |

\* cited by examiner

INTEGRATED POINT OF SALE TERMINAL

CROSS-REFERENCE TO RELATED APPLICATIONS

This is a continuation of copending application Ser. No. 12/751,122, filed Mar. 31, 2010, which claims priority to U.S. Provisional Patent Application Ser. No. 61/165,125, filed Mar. 31, 2009. The aforementioned applications are each incorporated by reference herein in their entireties for all purposes.

FIELD OF THE INVENTION

The present invention relates to point-of-sale terminals (POS). More particularly, the present invention relates to a gasoline dispenser POS terminal having multiple POS applications that share a single user interface.

BACKGROUND OF THE INVENTION

In today's retail market, retailers are increasing potential revenue by adding more and more customer options, products and services. With this growth, many POS devices have been tailored to meet a particular product or service. Different vendors provide POS devices capable of generating a transaction and a single user interface specific to that vendor's needs. Thus, the customer must initiate more than one transaction at different locations within the retailer's shop. For example, customers order fuel via a credit card, order a sandwich at a fast food shop within the convenience store (C-store) and purchase merchandise in a separate transaction at the convenience store POS.

The present invention recognizes and addresses the foregoing disadvantages, and others, of prior art constructions and methods. Various combinations and sub-combinations of the disclosed elements, as well as methods of utilizing same, which are discussed in detail below, provide other objects, features and aspects of the present invention.

SUMMARY OF THE INVENTION

The present invention recognizes and addresses disadvantages of prior art constructions and methods, and it is an object of the present invention to provide an improved hydraulic drive system for generating power. This and other objects may be achieved by an integrated point-of-sale terminal for use with a fuel dispenser having a site controller, at least one dispenser having a user interface, at least one processor at said site controller, memory coupled to said at least one processor, and a plurality of point-of-sale applications coupled to said site controller. Wherein said at least one site controller processor is configured to dynamically regulate which of the plurality of point-of-sale applications has control of said dispenser user interface based on a set of business rules.

In other embodiments, a plurality of dispensers each have a respective user interface, wherein said at least one site controller is configured to regulate which of said plurality of point-of-sale applications has control of each of said respective plurality of dispenser user interfaces based on said set of business rules. In still other embodiments, the plurality of point-of-sale (POS) applications comprise at least two of a welcome application, a payment application, a point-of-sale selection application, POS selling applications, a pre-fueling carwash merchandising application, a fueling application, an internet application, an advertising application, a post-fueling carwash merchandising application and a transaction finalization application.

In yet other embodiments, a director application is configured to dynamically control the flow of said plurality of POS applications. In still other embodiments, at least one operator console is operatively coupled to said site controller. In other embodiments, a third party content provider is operatively coupled to said site controller.

In some embodiments, the director application is configured to dynamically control the flow of said plurality of POS applications so that when one of said plurality of POS applications willingly relinquishes control of said at least one dispenser user interface, director application uses a predetermined set of business rules to determine which POS application should receive control of said at least one dispenser user interface. In other embodiments, said director application is configured to dynamically control the flow of said plurality of POS applications so that when one of said plurality of POS applications requests control of said at least one dispenser user interface, said director application asks a controlling application of said plurality of POS applications to relinquish control, and said controlling POS application relinquishes control to said one of said plurality of POS applications that requests control. In still other embodiments, the director application is configured to terminate a controlling application of said plurality of POS applications if one of said plurality of POS applications requests control of said at least one dispenser user interface and said controlling POS application refuses to relinquish control within a given period of time.

In an other embodiment, a method of allocating control of a user interface comprises the steps of providing a processor and memory, said processor being configured to operate based on a predefined set of business rules stored in said memory, providing a device operatively coupled to said processor and said memory, said device having a user interface for interaction with a user, determining, based on said predetermined set of business rules, which one of a plurality of point-of-sale applications should gain control of said user interface, receiving a request, from another one of said plurality of point-of-sale applications, to take control of said user interface, determining, based on said predefined set of business rules, when said another one of said plurality of point-of-sale applications can take control of said user interface, terminating said one of said plurality of point-of-sale applications control of said user interface, and transferring control of said user interface to said another one of said plurality of point-of-sale applications.

In some embodiments said plurality of point-of-sale applications comprises at least two of a welcome application, a payment application, a point-of-sale selection application, POS selling applications, a pre-fueling carwash merchandising application, a fueling application, an internet application, an advertising application, a post-fueling carwash merchandising application and a transaction finalization application.

In other embodiments, the step of determining further comprises terminating control after a predetermined period of time. In yet other embodiments, said predetermined set of business rules are dynamically changed based on an identity of the user. In still other embodiments, said predetermined set of business rules are dynamically changed based on the user's input to said user interface.

In yet another embodiment, a method of allocating control of a user interface comprises the steps of providing a processor and memory, said processor being configured to operate based on a predefined set of business rules stored in said memory, providing a fuel dispenser operatively coupled to said processor and said memory, said fuel dispenser having a user interface for interaction with a user, determining, based on said predetermined set of business rules and the user input at said user interface, which one of a plurality of point-of-sale applications should gain control of said user interface, receiving a request, from another one of said plurality of point-of-sale applications, to take control of said user interface, determining, based on said predefined set of business rules and the user input at said user interface, when said another one of said plurality of point-of-sale applications can take control of said user interface, and transferring control of said user interface to said another one of said plurality of point-of-sale applications.

In some of these embodiments, said plurality of point-of-sale applications comprises a plurality of a welcome application, a payment application, a point-of-sale selection application, POS selling applications, a pre-fueling carwash merchandising application, a fueling application, an internet application, an advertising application, a post-fueling carwash merchandising application and a transaction finalization application.

In other embodiments, said predetermined set of business rules are dynamically changed based on the identity of the user. In still other embodiments, said predetermined set of business rules are dynamically changed based on preferences preset for the user.

Various combinations and sub-combinations of the disclosed elements, as well as methods of utilizing same, which are discussed in detail below, provide other objects, features and aspects of the present invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
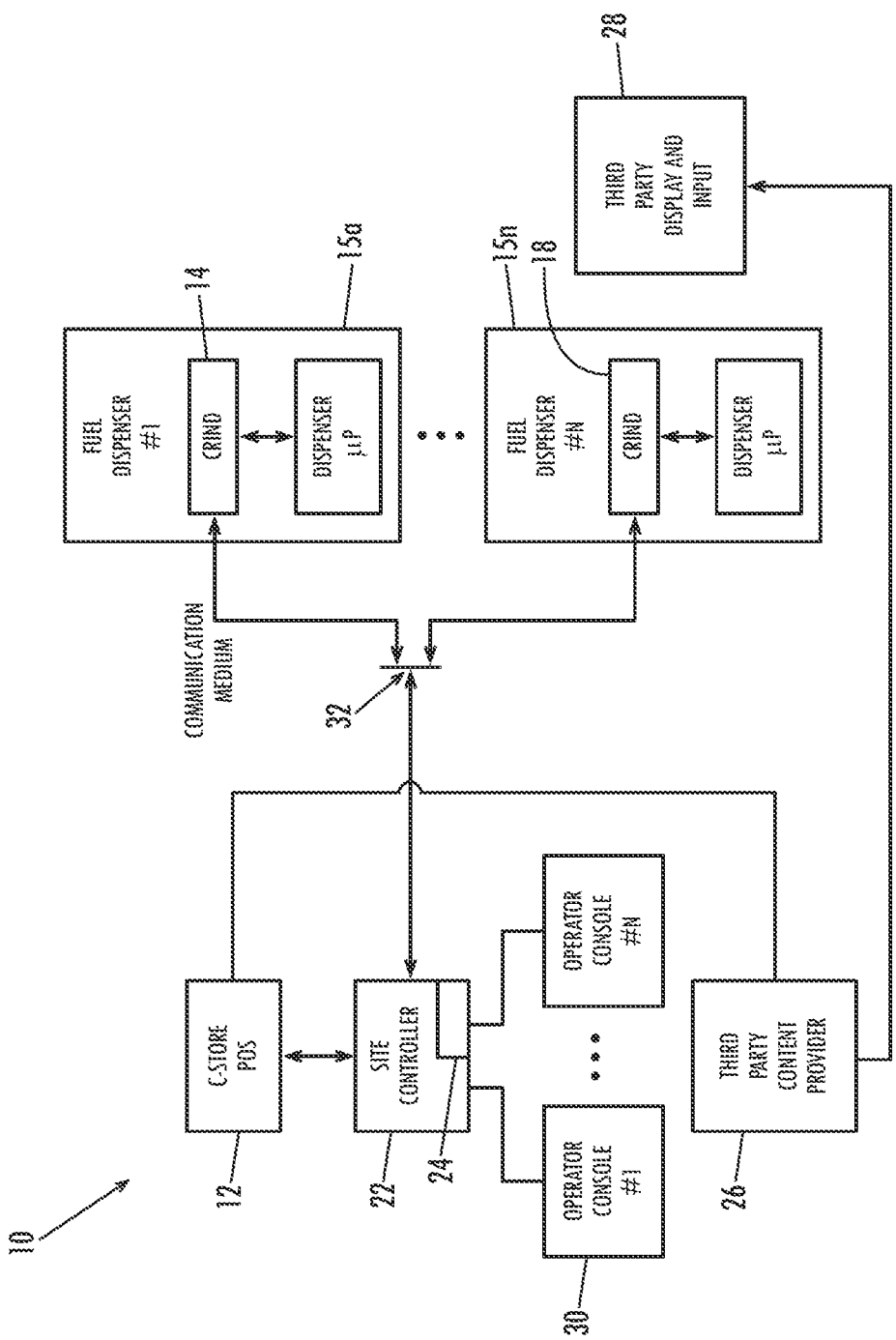
FIG. 1 is a diagrammatic representation of a fuel dispensing system in accordance with one embodiment of the present invention.

Repeat use of reference characters in the present specification and drawings is intended to represent same or analogous features or elements of the invention according to the disclosure.

DETAILED DESCRIPTION OF THE PREFERRED EMBODIMENT

Reference will now be made in detail to presently preferred embodiments of the invention, one or more examples of which are illustrated in the accompanying drawings. Each example is provided by way of explanation, not limitation, of the invention. It is to be understood by one of ordinary skill in the art that the present discussion is a description of exemplary embodiments only, and is not intended as limiting the broader aspects of the present invention, which broader aspects are embodied in the exemplary constructions. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, the present system 10 includes a plurality of point-of-sale (POS) application programs, including, but not limited to, a C-store POS 12, dispenser CRINDs 14 and 18 and third party content application 26 each operatively coupled to a site controller 22. U.S. Pat. No. 4,967,366, assigned to Gilbarco, Inc. and incorporated in its entirety herein, provides a detail description of CRINDs. A plurality of operator consoles 30 and a plurality of fuel dispensers 15a . . . 15n are also operatively coupled to site controller 22 by a communication medium 32, which may comprise one or more of a wireless network, a current loop, a high speed Ethernet connection, etc. Third party content application 26 may be operatively coupled to fuel dispensers 15a, 15b . . . 15n either directly through site controller 22 or directly to the fuel dispensers by a third party display unit 28.

Figure 2A:
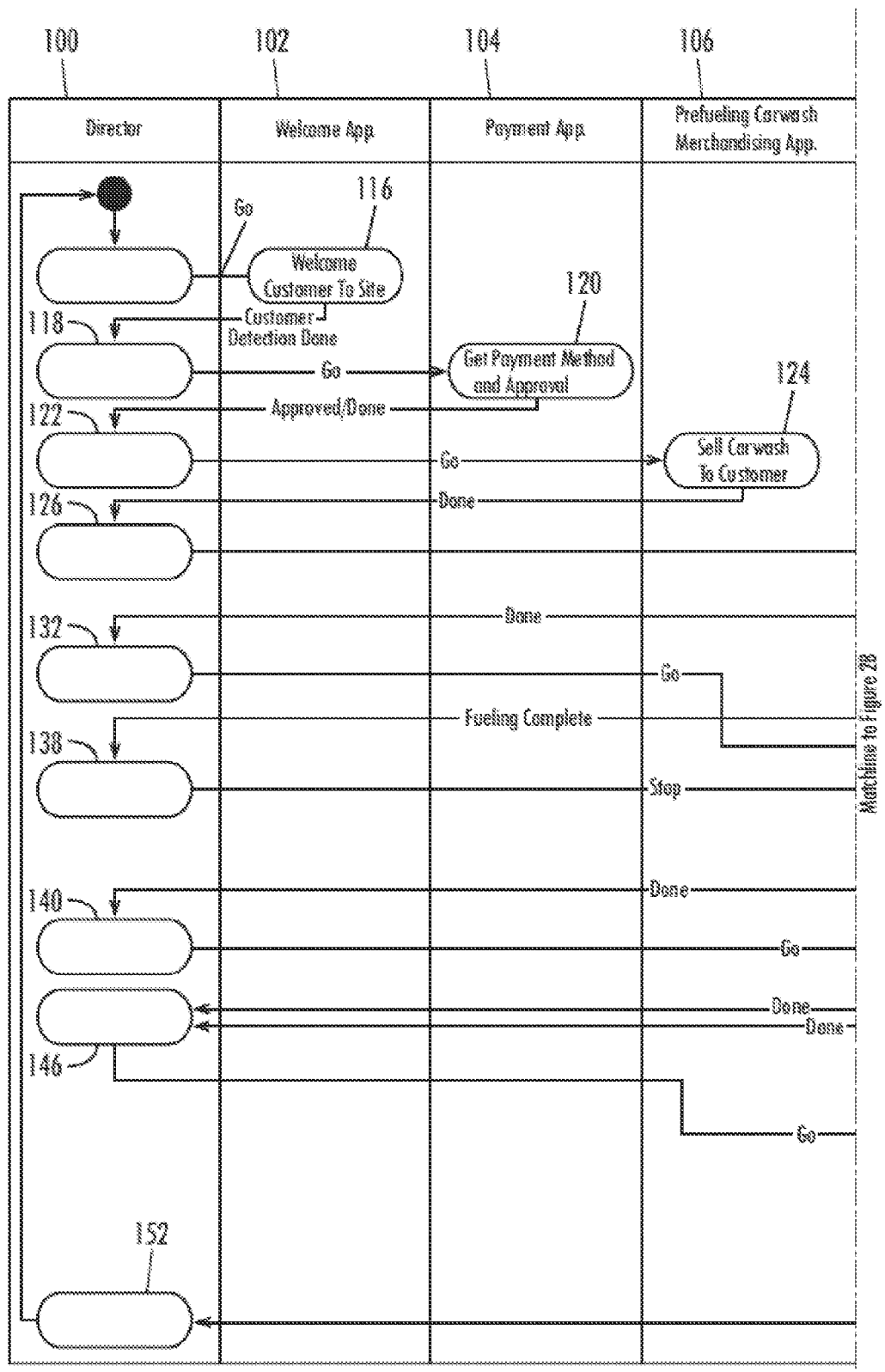
FIGS. 2A-2B is a flow diagram of a prior art control process for use with fuel dispensing systems.
Figure 2B:
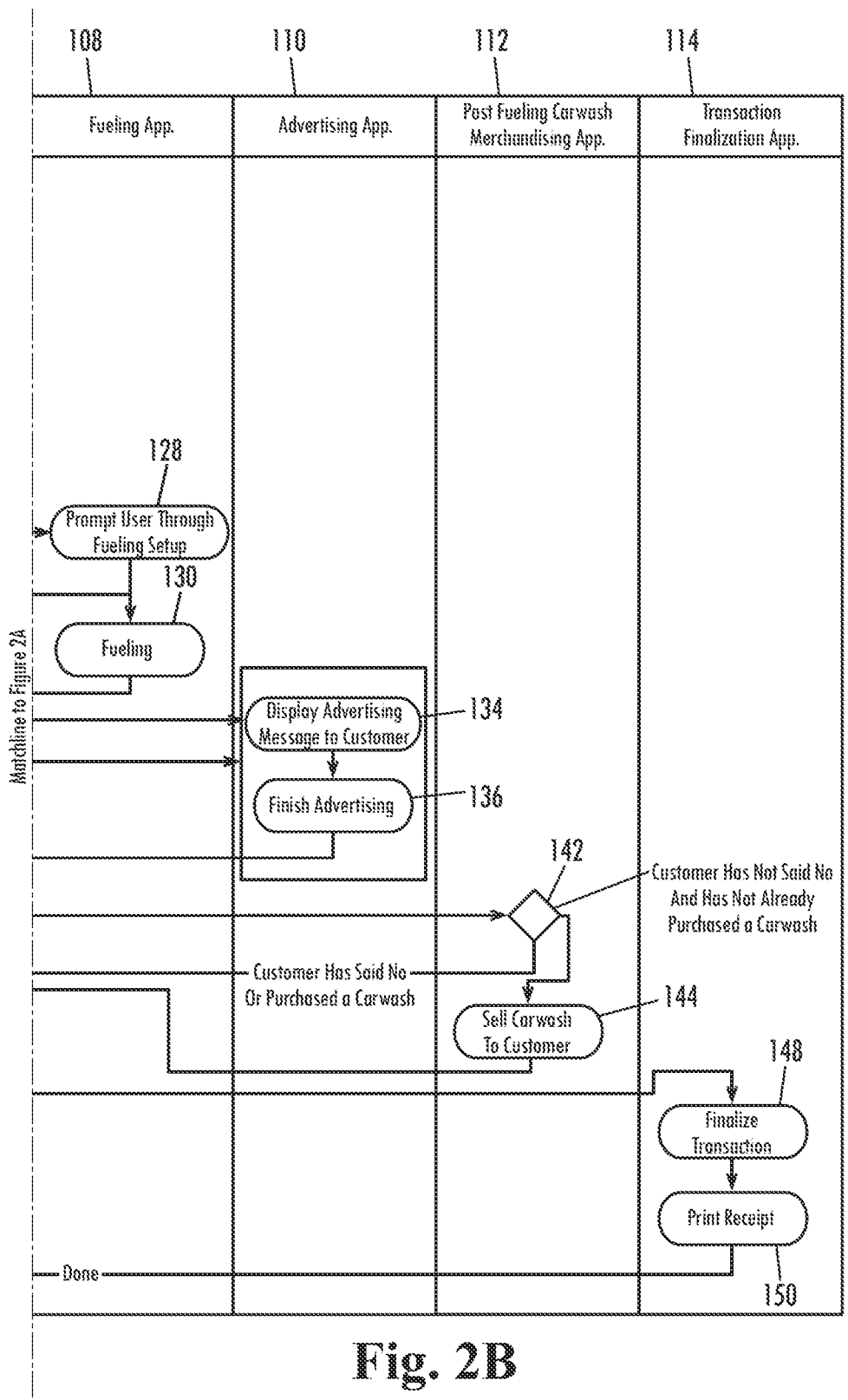

Referring to FIGS. 2A-2B, one prior art POS system flow diagram is shown having a director program 100, a welcome application 102, a payment application 104, a prefueling carwash merchandising application 106, a fueling application 108, an advertising application 110, a post-fueling carwash merchandising application 112 and a transaction finalization application 114. The POS state system is hard coded in system memory based on an events program. That is, the order of events is preset and cannot dynamically change based on customer input, customer preferences or based on any other factors. Moreover, the dispenser represents a single POS terminal for refueling and associated services such as a carwash.

In the prior art system, when a customer first initializes the system by engaging a keypress or swiping a credit card on the dispenser, welcome application 102, at step 116, welcomes the customer to the site and control is cycled back to director 100 as indicated at 118. Next at step 120, payment application 104 requests and receives payment information and obtains approval. Once approval is received, the program cycles back to director 100 as indicated at 122. At step 124, pre-fueling carwash merchandising application 106 provides a sales pitch to the customer, and upon receiving a response from the program cycles back to director 100, at step 126. At step 128, fueling application 108 prompts the user through a fueling set-up. Once the fueling operation is set-up, fueling begins at step 130. Control then cycles back to director 100, at step 132.

During fueling, at step 134, advertising application 110 displays an advertising message to the customer. Once the advertising message completes, at step 136, control is cycled back to director 100, at step 140. Post fueling carwash merchandising application 112, at step 142, advertises the carwash. If the customer responds by saying no to a carwash purchase, control cycles back to director 100, at step 146. Otherwise, the carwash purchase is set-up at step 144 and control is cycled back to director 100, at step 146. Once fueling is completed, transaction finalization application 114 is engaged, at step 148, and the transaction is completed. At step 150, a receipt is printed and control is returned to director 100, at step 152, and the system is reset to begin a new transaction.

From the above description, each application in the prior art system of FIGS. 2A-2B is engaged in a serial nature. The various applications cannot be engaged in any type of random order since the state system programming is hard coded into the system.

In the embodiment of the present invention shown in FIG. 1, multiple POS applications, as well as advertising applications, are separate programs that tie back to a software director service application 24 in site controller 22, where the director controls the flow of the different applications. Software director service application 24 determines which POS application 12, 14, 18 and 26 should have control of the current transaction and user interface. Director service application 24 may use a negotiation protocol and a set of business rules that allow the director service application to regulate which POS application has control of the user interface. The negotiation protocol preferably takes into account the following:

(1) when a POS application willingly relinquishes control of the user interface, the mediation service uses the predetermined business rules to determine which POS application should receive control of the user interface;

(2) if a POS application requests control of the user interface, the mediation service asks the controlling application to relinquish control, and the controlling POS application would willingly relinquish control to the POS application that requests control; or (3) if a POS application requests control of the user interface, and the controlling POS application refuses to relinquish control within a given period of time, then the mediation service, based on the predetermined business rules, either i. terminates the controlling application's control of the user interface and gives control to the requesting POS application, or ii. determines that the requesting POS application should not gain control and negatively acknowledges the requesting application request to terminate.

The negotiation protocol may also include rules that allow director service application 24 to ask the controlling POS application whether it can relinquish control or to give an estimate of how long it must control the transaction to reach a state where it can relinquish control so that the application's user interface displayed to the customer is not interrupted or abruptly changed.

In addition to the POS applications that share the user interface, system 10 may include applications running in the background that monitor items added to the transaction, add other items at no cost or at a discount, or make suggestions of other related products based on selected products. Moreover, loyalty based applications may monitor the transaction and collect information that can later be used to provide loyalty discounts to the customer during future transactions. Third party content application 26 can monitor the transaction and display targeted advertising during transaction idle time.

The director service application business rules may be based on any information that is available to the system that allows the customer to make an informed purchasing decision. Information that make up the rules can be based on the user's menu selection, the current transaction (i.e. what is being purchased), previously configured data such as application priorities, loyalty discounts based on current or previously purchases items and/or any specific data of the POS applications that can be viewed on the user interface.

Figure 3A:
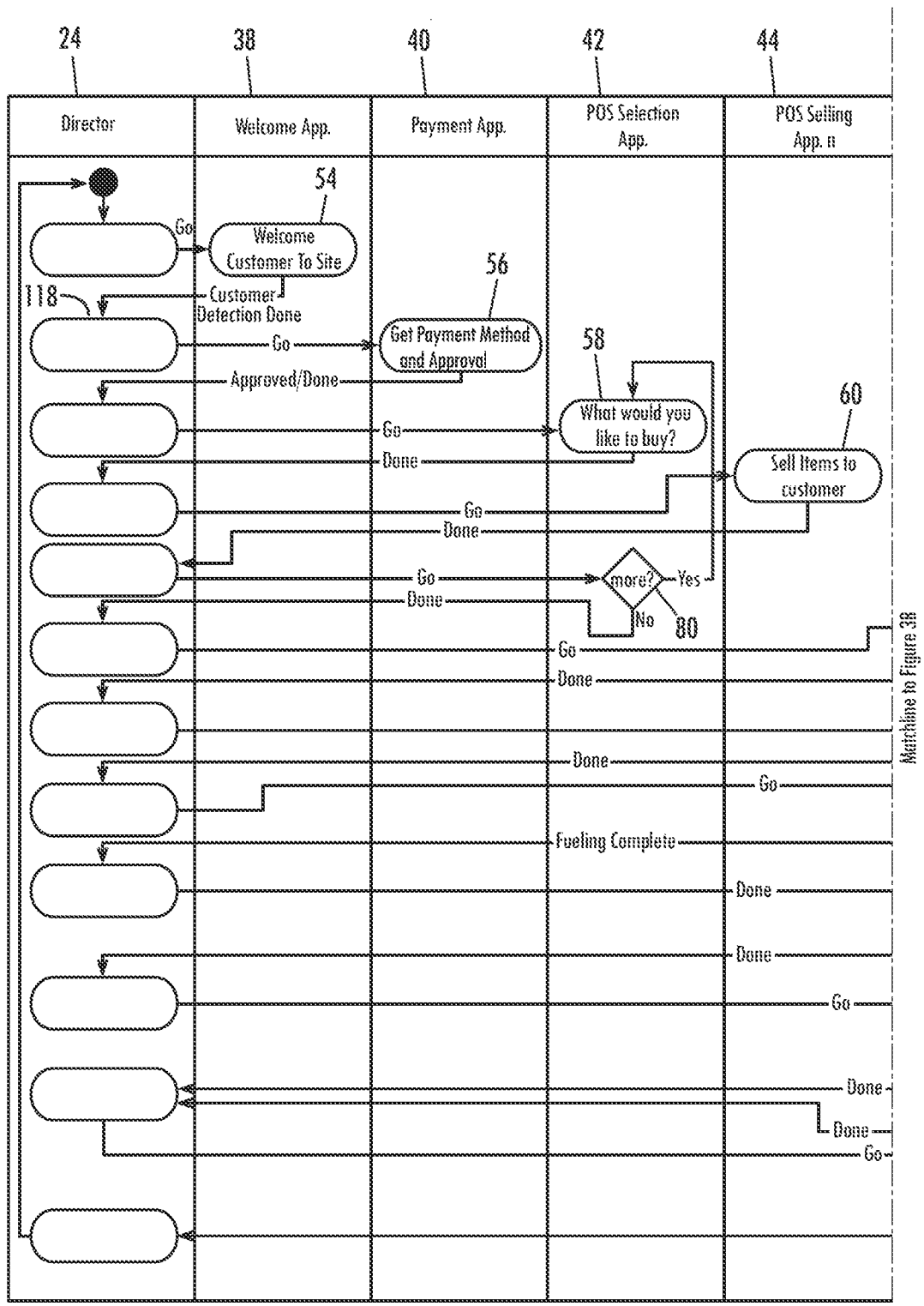
FIGS. 3A-3B is a flow diagram of a director control process in accordance with an aspect of the present invention for use with the fuel dispensing system of FIG. 1.
Figure 3B:
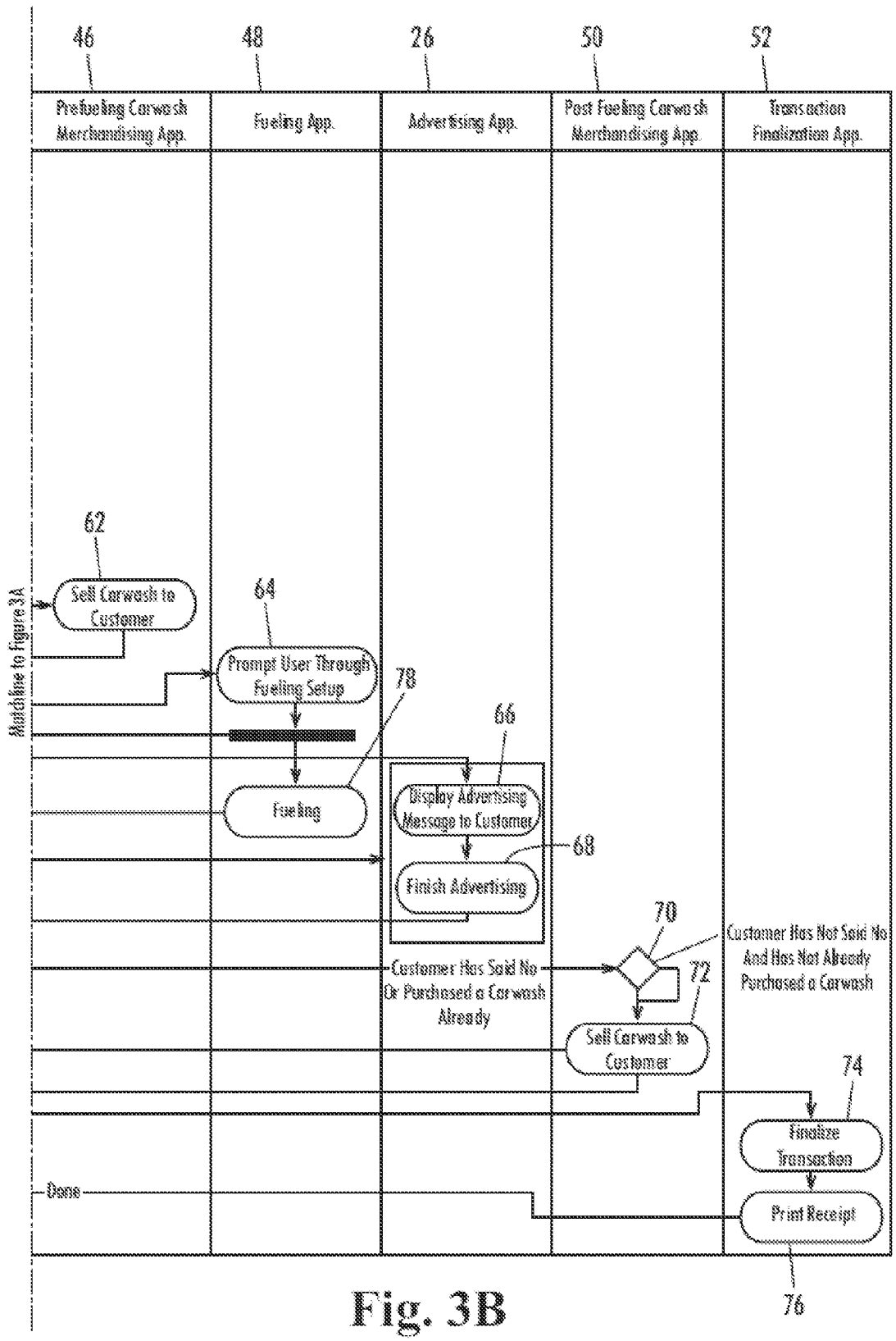

Referring to FIGS. 3A-3B, one embodiment of director service application flow for use with the system of FIG. 1 is shown having a director service application 24 that resides in site controller 22, a welcome application 38, a payment application 40, a point-of-sale selection application 42, POS selling applications 44 (may include one or more branded or co-branded POS selling applications), a pre-fueling carwash merchandising application 46, a fueling application 48, an advertising application 26, a post-fueling carwash merchandising application 50 and a transaction finalization application 52. Director service application 24 is preferably an all software architecture based on business rules, which may be dynamic based on what the customer is currently doing, what the customer has previously done or based on preset customer preferences. For example, if the customer indicates that they want to purchase a hamburger and fries, director service application 24 engages a provider point-of-sale terminal, for example a MCDONALD'S® POS and allows the customer to interact with the POS selling application to complete a food transaction. Once the transaction is completed, the system can return to the fueling process, return control to the director service application to determine if another POS application is warranted or collect data based on the transaction to determine what application should take control of the user interface.

In one embodiment of the director, and still referring to FIGS. 3A-3B, when a customer first engages the system, welcome application 38, at step 54, provides a welcome message for the customer and returns control to director service application 24 (also simply called "director" herein). Next at step 56, payment application 40 requests control of the user interface, requests payment information, receives payment information and obtains approval for the fueling transaction. Once approval is received, control of the user interface is passed back to director 24. At step 58, director 24 passes control of the user interface to POS selection application 42, where the customer is prompted as to what purchases the customer is interested in making at the fuel dispenser. Based on the customer's response, director 24 receives control of the user interface and passes control to one of POS applications 44, which can be chosen from one of many applications associated with the fuel dispenser. For example, point-of-sale application 44 may include, but is not limited to, fast food restaurants located at the fueling site or off site in the general vicinity of the fueling site, a convenience store at the fuel site, on-line merchandising sites, etc. Each POS application may be branded or co-branded depending on the relationship of the merchant with the owner of the fuel dispenser. The customer may complete a purchase that is added to the customer's fueling bill. Once a transaction is completed, control is again transferred back to director 24.

Director 24, at step 80, transfers control to POS selection application 42 to prompt the user as to additional purchases. If the customer requests an additional transaction, control is passed to step 58 where the user interface inquires as to what products the customer has interest in purchasing. Based on the customer's response, control is transferred from POS selection application 42 to a POS selling application through director 24. If the customer responds in the negative, at step 80, control maybe passed back to the pre-fueling carwash merchandising application 46, at step 62. If the customer responds to pre-fueling carwash merchandising application 46, control is passed to fueling application 48, at step 64, through director 24.

Fueling application 48 prompts the user through a fueling set-up on the user interface. Once the fueling operation is set-up, fueling begins at step 78. Control is then passed to director 24. During fueling, director 24 may pass control of the user interface to an advertising application 26, at step 66, at which time advertisements are displayed at the fuel dispenser. The advertisements may be based on data from a loyalty program, information from purchases made on the various POS applications or general advertisements regarding products sold at the convenience store. Once the advertising message completes, at step 68, control is passed to a post fueling carwash merchandising application 50, at step 70, via director 24. If the customer responds positively to the purchase of a carwash, the carwash purchase is set-up, at step 72, and control is passed back to director 24. Otherwise, control is passed back to director 24 without setting up a car wash. Once fueling is completed, director 24 passes control of the user interface to transaction finalization application 52, at step 74, and the transaction is completed. At step 76, a receipt, if requested, is printed and control is returned to director 24, and the system is reset to begin a new transaction.

It should be understood that anytime in the fueling process, director 24 may pass control to any application associated with the system. For example, if a food purchase was made, a notice that the food is ready for pick-up may be displayed on the user interface by POS selling application 44. That is, the POS selling application requests control of the user interface from director 24. Director 24 can evaluate the conditions of the user interface to determine if control may be relinquished to the requesting application. If control cannot be relinquished, director 24 may respond back to the application indicating when the application may take control. The application may then make another request after the predetermined time has elapsed, or director 24 may pass control to the requesting application after the predetermined time has elapsed. In other embodiments, the customer may make an inquiry by entering data at the user interface. Based on the input, director 24 may request that one of the POS applications 44 take control of the user interface or may engage POS selection application 42 to request additional information from the customer to determine which application should gain control of the user interface.

In all of the embodiments disclosed above, software director service application 24 allows the fuel dispenser to transact multiple purchases both fuel and non-fuel related at a single point-of-sale terminal. Director service application 24 allows for dynamic presentment of POS applications based on business rules and user input. It should be understood that software director service application 24 can be used at any unmanned terminal, i.e. kiosk in a store, ATM machine, or any other terminal that allows a customer to carry out a transaction. In some embodiments, the kiosk may have two screens operating simultaneously where different POS applications have access to each user interface. For example, the payment information and the sales application can be displayed on one or more screens. In these embodiments, one screen may have a dedicated application, such as the payment application or both screens may be dynamically changeable and controlled by software director service application 24.

In other embodiments, director 24 may wirelessly communicate with one or more handheld devices so that multiple customers may transact with the system at one time. That is, the POS terminal may contain one or more wireless modems configured to communicate with handheld devices such as through WIFI, a Bluetooth connection, through a cellular connection or via the Internet. This allows for the throughput of customers making transactions to increase substantially only limited by the number of wireless connections that the system can support. In some embodiments, one or more directors 24 may be used to increase the number of transactions that can simultaneously be carried out by the system. The transaction may be finalized on the handheld device or it may be completed on a single dedicated user interface.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit of the claims.

What is claimed:

1. A system for allocating control of a user interface in a retail device, comprising:
    at least one processor configured to execute a director service application for regulating control of a plurality of point-of-sale (POS) applications to the user interface of the retail device based at least in part on a predefined set of business rules; and
    a memory coupled to the at least one processor for storing instructions related to the director service application,
    wherein the director service application is configured to determine whether to terminate control of the user interface from a first POS application of the plurality of POS applications in favor of a second POS application of the plurality of POS applications based at least in part on a request from the second POS application for the first POS application to relinquish control of the user interface.

2. The system of claim 1, wherein the at least one processor is comprised within the retail device to facilitate performing a transaction using at least the first POS application and the second POS application.

3. The system of claim 2, wherein the retail device is a fuel dispenser.

4. The system of claim 1, wherein the retail device is located remotely from the at least one processor.

5. The system of claim 1, wherein the first POS application relates to a POS selection application For selecting one of the plurality of POS application to execute on the user interface, and the second POS application relates to one of the plurality of POS applications selected via the first POS application controlling the user interface.

6. The system of claim 1, wherein the director service application is further configured to regulate control of respective user interface on a plurality of other retail devices.

7. The system of claim 1, wherein the plurality of POS applications comprises at least two of a welcome application, a payment application, a POS selection application, POS selling applications, a pre-fueling carwash merchandising application, a fueling application, an interact application, an advertising application, a post-fueling carwash merchandising application and a transaction finalization application.

8. The system of claim 1, wherein the director service application is further configured to dynamically control the user interface such that the director service application uses the predetermined set of business rules to determine which of the plurality of POS applications receives control of the user interface when one of the plurality of POS applications relinquishes control of the user interface.

9. The system of claim 1, wherein the director service application is further configured to terminate a controlling application of the first POS application where the first POS application t:ails to relinquish control of the user interface after a given period of time from the request of the second POS application.

10. The system of claim 1, wherein the director service application is further configured to dynamically change the predetermined set of business rules based at least in part on an identity of a user obtained by the user interface.

11. The system of claim 1, wherein the director service application is further configured to dynamically change the predetermined set of business rules based at least in part on input of a user obtained by the user interface.

12. A method for allocating control of a user interface of a retail device, comprising:
- determining, using at least one processor, a point-of-sale (POS) application of a plurality of POS applications to have control of the user interface on the retail device;
- receiving a request from another POS application to obtain control he user interface while the first POS application controls the user interface;
- terminating control of the user interface from the POS application based on a predefined set of business rules; and
- transferring control of the user interface to the other POS application based on the predefined set of business rules.

13. The method of claim 12, wherein the at least one processor is comprised within the retail device.

14. The method of claim 13, wherein the retail device is a fuel dispenser.

15. The method of claim 12, wherein the retail device is remotely located from the at least one processor.

16. The method of claim 12, wherein the plurality of POS applications comprises at least two of a welcome application, a payment application, a POS selection application, POS selling applications, a pre-fueling carwash merchandising application, a fueling application, an internet application, an advertising application, a post-fueling carwash merchandising application and a transaction finalization application.

17. The method of claim 12, wherein the terminating comprises terminating control of the user interface from the POS application based at least in part on the POS application failing to relinquish control of the user interface within a period of time from receiving the request from the other POS application.

18. The method of claim 12, further comprising dynamically changing the predetermined set of business rules based at least in part on an identity of a user obtained by the user interface.

19. The method of claim 12, further comprising dynamically changing the predetermined set of business rules based at least in part on input of a user Obtained by the user interface.

* * * * *

UNITED STATES PATENT AND TRADEMARK OFFICE
CERTIFICATE OF CORRECTION

PATENT NO. : 9,047,596 B2  
APPLICATION NO. : 13/770567  
DATED : June 2, 2015  
INVENTOR(S) : Rodger K. Williams et al.

Page 1 of 1

It is certified that error appears in the above-identified patent and that said Letters Patent is hereby corrected as shown below:

In the claims,

In Claim 5, column 8, line 32, please delete "For" and replace with --for--.

In Claim 5, column 8, line 33, please delete "application" and replace with --applications--.

In Claim 6, column 8, line 39, please delete "interface" and replace with --interfaces--.

In Claim 7, column 8, line 44, please delete "interact" and replace with --internet--.

In Claim 9, column 8, line 57, please delete "t:ails" and replace with --fails--.

In Claim 19, column 10, line 19, please delete "Obtained" and replace with --obtained--.

Signed and Sealed this  
Ninth Day of February, 2016

Michelle K. Lee  
*Director of the United States Patent and Trademark Office*